United States Patent [19]
Schemmel

[11] 3,924,203
[45] Dec. 2, 1975

[54] MODULATOR CIRCUITS FOR TRANSLATING D.C. SIGNALS INTO SYNCHRONOUS A.C. SINGALS

[75] Inventor: Hans Robert Schemmel, Nurnberg, Germany

[73] Assignee: Tekade Felten & Guilleaume Fernmeldeanlagen GmbH, Nurnberg, Germany

[22] Filed: May 16, 1974

[21] Appl. No.: 470,553

[30] Foreign Application Priority Data

May 18, 1973 Germany ............................ 2325191

[52] U.S. Cl. .................. 332/9 R; 307/240; 307/268; 328/27; 328/63; 332/24

[51] Int. Cl.$^2$ ........................ H03K 7/00; H03K 5/02

[58] Field of Search ............ 332/9 R, 9 T, 24, 43 B; 328/27, 63; 307/268, 240

[56] References Cited

UNITED STATES PATENTS

| | | | |
|---|---|---|---|
| 3,482,113 | 12/1969 | Heesh | 307/240 X |
| 3,697,891 | 10/1972 | Shade et al. | 332/9 T |
| 3,699,423 | 10/1972 | Morrison | 307/240 X |
| 3,835,419 | 9/1974 | Milne et al. | 332/9 R |

*Primary Examiner*—Alfred L. Brody
*Attorney, Agent, or Firm*—Waters, Schwartz & Nissen

[57] ABSTRACT

A modulator for modulating an a.c. signal with a d.c. signal from a d.c. signal line, in which is provided a pulse shaping circuit the input of which is arranged to be connected alternatively to the d.c. signal line for closed-circuit feed or to the output of an inverter whose input is connected to the d.c. signal line for open-circuit feed, the pulse shaping circuit comprising a low-pass filter whose input arrangement cooperates with the d.c. signal line or the inverter output to provide independently adjustable time constants for closed — or open-circuit feed respectively and whose output is connected to modulating means for modulating the a.c. signal.

7 Claims, 2 Drawing Figures

MODULATOR CIRCUITS FOR TRANSLATING D.C. SIGNALS INTO SYNCHRONOUS A.C. SIGNALS

Figures 1, 2:
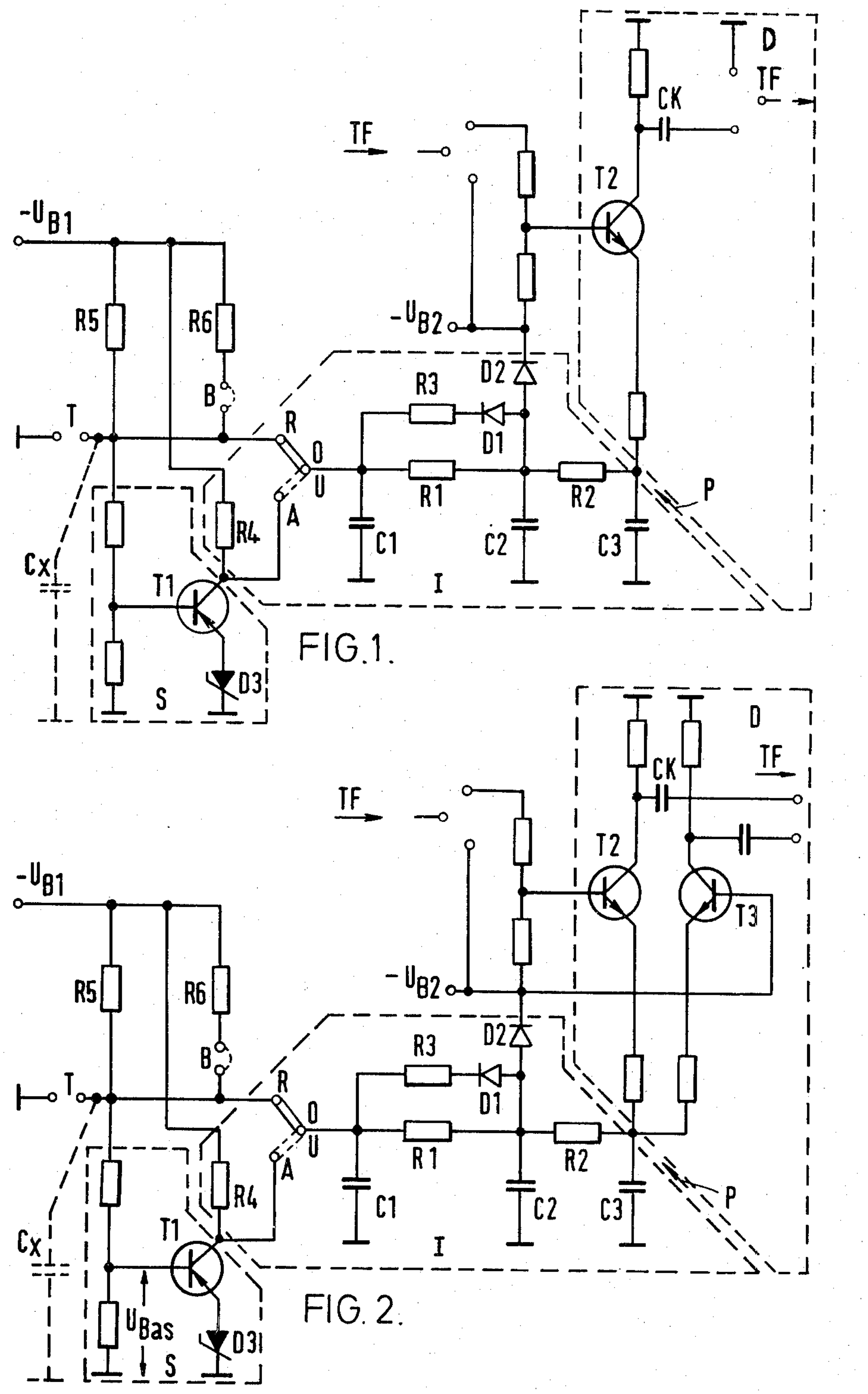

The invention relates to modulator circuits for translating a d.c. signal into a practically synchronous a.c. signal whose bandwidth is restricted and which is modulated as a closed-circuit signal or as an open-circuit signal on to a carrier frequency, correction being applied to the said signal by a signal shaper and by an additional circuit stage.

In order to provide distortion-free modulation of carrier frequencies with d.c. signals, the time equivalent of the effective a.c. signal envelope curve must substantially correspond to the length of the keyed d.c. signal.

A circuit for keying d.c. signals is known and corresponds substantially to the principle of a simplex push-pull modulator with minor variations (Ring: "Einfuhrung in die Tragerfrequenztechnik," volume 10, page 10).

An LC filter is connected downstream of the system to restrict the bandwidth of the carrier frequency signal, a procedure which is necessary in order to avoid disturbances in the carrier frequency system, and a parallel tuned circuit can be used to this end in the simplest case.

Since the input d.c. signal in telecommunications systems is often transmitted over lines which are subject to significant capacitive effects, it is necessary to correct the distortion thus introduced. This, however, is not possible in the known system.

Efforts must also be made to ensure that noise voltages which are coupled through the d.c. lines have the least possible effect on the d.c. signal.

This and the necessary restriction of the bandwidth is achieved by a known system (German Offenlegungsschrift 2,013,000). However, the attack and decay portions of the envelope are subject to different time constants, the effect of which is a disturbing signal distortion in the signal receiver, particularly if the band is greatly restricted.

It is an object of the invention to disclose a circuit which provides separate, independent and optimum equalisation for the open-circuit feed and for the closed-circuit feed of the d.c. signal accompanied by maximum band-width restriction and improved noise voltage freedom of the carrier frequency signal.

The present invention consists of a modulator for modulating an a.c. signal with a d.c. signal from a d.c. line, the modulator comprising a pulse shaping circuit having an input and an output; a modulating means having an input for a modulating signal, an input for the a.c. signal, and an output for a modulated a.c. signal, an inverter having an input and an output, and a switch means having two alternatively selectable contacts and a wiper contact, the d.c. line being connected to one of the alternatively selectable constants and to the inverter input, the inverter output being connected to the other alternatively selectable contact, the wiper contact being connected to the pulse-shaping circuit input, the output of which is connected to the modulating signal input of the modulating means; wherein the pulse shaping circuit comprises a low pass filter having an input which is arranged to cooperate with the d.c. line for closed-circuit feed, when the switch means connects the d.c. line to the pulse shaper circuit input, and with the inverter output for open-circuit feed, when the switch means connects the inverter output to the pulse shaper input, to provide independently adjustable time constants for open-and closed-circuit feed.

Preferably there is provided an operating voltage source the low pass filter of said pulse shaping circuit comprising a bottoming diode, two resistors, a first capacitor, and two other capacitors, the d.c. line comprising a key and an input resistor, the inverter comprising a single transistor, a Zener diode, a potentiometer, and a further resistor, the switch means comprising a change-over switch, there being provided a second equalizing means; in which each of the first capacitor and the further capacitors is connected to ground and the closed circuit feed is applied via the key, through the input resistor which, together with the first capacitor in parallel with any stray cable capacitance present, functions as a bandwidth-restricting element, the bottoming diode being arranged between the low pass filter resistors and the modulating means so as to restrict charging of the further capacitors, the open-circuit feed being applied through the further resistor having resistance necessary to ensure correctly timed charge reversal of the first capacitor i.e. by having to adapt itself to the time constants of the timing element which is operative for the closed-circuit feed and to the different closed—circuit voltage across the first capacitor, the Zener diode, which functions as a noise voltage suppressor, being connected between ground and the emitter of the transistor, whose base is connected via the potentiometer to the keying line and whose collector is connected to the change over switch and via the further resistor to the potential terminal of the operating voltage source.

Two preferred embodiments of the invention will be described with reference to the accompanying drawings, in which:

FIG. 1 shows the circuit diagram of a system in which the modulator D is constructed as a single-ended amplifier; and FIG. 2 shows the circuit diagram with modulator D as a differential amplifier.

The circuits shown in FIGS. 1 and 2 both provide for change-over switching between open circuit and closed circuit feed of the d.c. signal. The d.c. keying arrangement feeds a signal shaper I and there is provided a circuit stage S for inverting the d.c. signal and for suppressing noise voltages during open-circuit feed operation.

For closed-circuit keying of the d.c. signal, the signal current flows from the operating voltage source $-U_{B1}$ through the resistor R5 which, together with the first low-pass capacitance C1 in parallel with any cable capacitance Cx which may be present, functions as a bandwidth-restricting timing element (R5 (C1+Cx).

A resistor R6 may be connected in parallel with the resistor R5 by short-circuiting contacts B to enable an increased discharge current to flow so as to reduce the discharge time of the cable capacitance Cx if such a cable capacitance is present.

In closed-circuit keying the d.c. signal (modulation signal) is supplied directly via the change-over switch U in position R/0 to the pulse shaper I and thence to the carrier frequency modulation circuit D via the series resistors R1 and R2. These resistors together with the three capacitors C1, C2 and C3 form a low-pass filter with respect to ground for restricting the bandwidth by deforming the d.c. signal, i.e., the d.c. signal is coupled to the emitter resistor of the transistor T2 in FIG. 1 or to the emitter resistors of the transistors T2 and T3 in FIG. 2. The signal is also coupled via a signal correcting element, which comprises the resistor R3 and the diode D1 connected in series, this combination being connected in parallel with the resistor R1, to the emitter resistor of the transistor T1 in FIG. 1 or to the emitter resistors of the transistors T2 and T3 in FIG. 2. The base of the or each transistor is d.c.-connected to a voltage source $-U_{B2}$, a bottoming diode D2 being connected between the said voltage source and the diode D1 to limit charging of the capacitors C2 and C3.

In the system of FIG. 1, which operates with a single-ended amplifier i.e., with only one transistor T2, the capacitor C3 will be advantageously dimensioned so that it presents an adequate short-circuit to the carrier frequency signal. Suppression of the d.c. keying signal spectrum will then be provided by means of a coupling capacitor $C_K$.

However, when the differentail amplifier system of carrier frequency modulator incorporating the transistor T2 and T3 is used (see FIG. 2), the keying spectrum of the d.c. signal can be more readily suppressed in the output signal.

The voltage $|U_{B1}|$ of the voltage sources must always be greater than $|U_{B2}|$ the difference being a measure of the immunity to noise voltage in closed-circuit signalling, since the transistor T2 or the transistors T2 and T3 are conductive until the voltage at the coupling point P drops below the voltage of $-U_{B2}$ by more than the voltage $U_T$ (threshold voltage of the transistors), i.e., noise voltages with a peak of less than or equal to $|U_{B1}| - |U_{B2}| - |U_T|$ at the coupling point P do not cause any interruption of current.

If the voltage at the coupling point P exceeds this value or if it becomes more positive than $-U_{B2}$ the transistor T2 of the transistors T2 and T3 will be driven to cut-off and the output signal interrupted. In closed-circuit feed operation, the signal distortion may be adjusted with the resistor R3 in conjunction with the diode D1.

In open-circuit feed operation, the d.c. signal is supplied to the base of the transistor T1 in the circuit stage S, the operating voltage source $-U_{B1}$ being connected via the resistor R4 to the collector of the transistor T1 and to the change over switch U contact A/O of the signal shaper. The value of the resistor R4 is arranged to provide signal correction by producing correctly timed reversal of the charge of the low-pass filter capacitor C1. The function of this resistor is to adapt to the time constants of the timing element R5 (C1+Cx), which is operative in closed-circuit feed operation, and to adapt itself to the different closed-circuit voltage across the capacitor C1.

A Zener diode D3 is connected between the emitter and ground of the transistor T1 in order to substantially suppress noise voltages on the keying line in the circuit stage S during open-circuit operation. With the transducer T1 driven to cut-off, the emitter current of the transistor T2 or of the transistors T2 and T3 will flow from the operating voltage source $-U_{B1}$. The transistor T1 remains driven to cut-off as long as the base voltage $U_{Bas}$ is less than or equal to $U_Z + U_T$ where $U_Z$ is the Zener voltage and $U_T$ is the threshold voltage of the transistor) i.e., noise voltages at levels up to $U_Z + U_T$ volts supplied to the base of T1 do not alter the current flow through the transistors T2 and T3. So-called fast noise voltages (voltage peaks of higher frequency) are reduced in the signal shaper I by the RC low-pass filter R1/R2; C1/C2/C3.

The arrangement according to the invention permits separate and independent equalisation setting for closed-circuit and open-circuit feed operation of the d.c. signal, such setting remaining independently operative in each case for both methods of operation depending on the position of the change-over switch U.

Various modifications may be made within the scope of the invention.

I claim:

1. A modulator for modulating an a.c. signal with a d.c. signal from a d.c. line, the modulator comprising a pulse shaping circuit having an input and an output; a modulating means having an input for a modulating signal, an input for the a.c. signal, and an output for a modulated a.c. signal, an inverter having an input and an output, and a switch means having two alternatively selectable contacts and a wiper contact, the d.c. line being connected to one of the alternatively selectable contacts and to the inverter input, the inverter output being connected to the other alternatively selectable contact, the wiper contact being connected to the pulse-shaping circuit input, the output of which is connected to the modulating signal input of the modulating means; wherein the pulse shaping circuit comprises a low pass filter having an input which is arranged to cooperate with the d.c. line for closed-circuit feed, when the switch means connects the d.c. line to the pulse shaper circuit input, and with the inverter output for open-circuit feed, when the switch means connects the inverter output to the pulse shaper input, to provide independently adjustable time constants for open-and closed-circuit feed.

2. A modulator circuit according to claim 1, for translating a d.c. signal into a practically synchronous a.c. signal whose bandwidth is restricted and which may be modulated as a closed circuit signal or as an open circuit signal on to a carrier frequency, correction being applied to the said signal by the pulse shaping circuit, there being provided an operating voltage source, the low pass filter of said pulse shaping circuit comprising a bottoming diode, two resistors, a first capacitor, and two other capacitors, the d.c. line comprising a key and an input resistor, the inverter comprising a single transistor, a zener diode forming a noise voltage suppressor being connected between ground and the emitter of the transistor, a potentiometer interconnecting the base of the transistor and the keying line, and a further resistor, the switch means comprising a change-over switch connected to the collector of the transistor which is connected through said further resistor to the potential terminal of the operating voltage source, there being provided a second equalizing means; in which each of the first capacitor and the further capacitors is connected to ground and the closed-circuit feed is applied, through the key, through the input resistor which, together with the first capacitor in parallel with any stray cable capacitance present, functions as a bandwidth-restricting element, the bottoming diode being arranged between the low pass filter resistors and the modulating means so as to restrict charging of the further capacitors, the open-circuit feed being applied through the further resistor having resistance necessary to ensure correctly timed charge reversal of the first capacitor by adapting to the time constants of the timing element which is operative for the closed-circuit feed and to the different closed-circuit voltage across the first capacitor.

3. A modulator according to claim 2, in which the second equalizing means comprises a resistor and a diode, the resistor and diode being connected in series, both of which are connected in parallel with one of the low-pass filter resistors.

4. A modulator according to claim 2, in which there is provided an additional resistor which can be connected, when required, in parallel with the input resistor so as to reduce the discharge time of the cable capacitance in lines subject to significant capacitance in which the d.c. signal (modulation signal) is fed-in by closed-circuit operation.

5. A modulator according to claim 2, in which there is provided a second voltage source, which is applied to the modulating means, the first voltage source being applied to the d.c. keying circuit, the modulus of the voltage of the first voltage source being greater the modulus of the voltage of the second voltage source so as to provide protection against noise voltages.

6. A modulator according to claim 2, in which the modulating means comprises a single ended, amplifier.

7. A modulator according to claim 2, in which the modulating means comprises a differential amplifier.

* * * * *